United States Patent
Bender et al.

(10) Patent No.: US 8,495,265 B2
(45) Date of Patent: *Jul. 23, 2013

(54) AVOIDING NON-POSTED REQUEST DEADLOCKS IN DEVICES BY HOLDING THE SENDING OF REQUESTS

(75) Inventors: Carl A. Bender, Highland, NY (US); Jeffrey C. Hanscom, Poughkeepsie, NY (US); Thomas D. Needham, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/151,073

(22) Filed: Jun. 1, 2011

(65) Prior Publication Data
US 2012/0311212 A1 Dec. 6, 2012

(51) Int. Cl.
*G06F 13/362* (2006.01)
*G06F 13/364* (2006.01)

(52) U.S. Cl.
CPC .................................. *G06F 13/364* (2013.01)
USPC ........................................ 710/113; 710/309

(58) Field of Classification Search
USPC .................. 710/104–125, 308–311
See application file for complete search history.

(56) References Cited

U.S. PATENT DOCUMENTS

| | | | |
|---|---|---|---|
| 5,805,816 A | 9/1998 | Picazo et al. | |
| 6,078,736 A | 6/2000 | Guccione | |
| 6,122,679 A | 9/2000 | Wunderlich | |
| 6,226,704 B1 * | 5/2001 | Wang et al. | 710/310 |
| 6,243,781 B1 * | 6/2001 | Gandhi et al. | 710/313 |
| 6,292,910 B1 | 9/2001 | Cummins | |
| 6,314,477 B1 | 11/2001 | Cowger et al. | |
| 6,507,211 B1 | 1/2003 | Schultz et al. | |
| 6,557,101 B1 | 4/2003 | MacDonald et al. | |
| 6,735,174 B1 * | 5/2004 | Hefty et al. | 370/235 |
| 6,757,768 B1 * | 6/2004 | Potter et al. | 710/112 |
| 6,832,279 B1 * | 12/2004 | Potter et al. | 710/112 |
| 6,867,614 B1 | 3/2005 | Le Graverand et al. | |
| 6,937,063 B1 | 8/2005 | Sun et al. | |

(Continued)

FOREIGN PATENT DOCUMENTS

| | | |
|---|---|---|
| CN | 1488105 A | 4/2004 |
| CN | 1598798 A | 3/2005 |

(Continued)

OTHER PUBLICATIONS

Chencinski, E.W. et al., "IBM System z10 I/O Subsystem," IBM J. Res. & Dev., vol. 53, No. 1, p. 6, Jan. 2009, pp. 6:1-6:13.

(Continued)

*Primary Examiner* — Raymond Phan
(74) *Attorney, Agent, or Firm* — Steven Chiu, Esq.; Blanche E. Schiller, Esq.; Heslin Rothenberg Farley & Mesiti P.C.

(57) ABSTRACT

Processing within a device is controlled in order to avoid a deadlock situation. A local request engine of the device determines prior to making a request whether the port of the device that is to service the request is making forward progress in processing other requests. If forward progress is being made, then the request is forwarded to the port. Otherwise, the request is held. This avoids a deadlock situation and allows the device to remain operative even in partial recovery situations.

14 Claims, 4 Drawing Sheets

U.S. PATENT DOCUMENTS

| | | | |
|---|---|---|---|
| 7,096,398 B1 | 8/2006 | Mukherjee | |
| 7,124,230 B2 * | 10/2006 | Smith et al. | 710/310 |
| 7,210,000 B2 | 4/2007 | Creta et al. | |
| 7,231,560 B2 | 6/2007 | Lai et al. | |
| 7,412,555 B2 | 8/2008 | Wang | |
| 7,412,589 B2 | 8/2008 | Feiste | |
| 7,437,643 B2 | 10/2008 | Khanna et al. | |
| 7,443,869 B2 | 10/2008 | Solomon et al. | |
| 7,444,500 B1 | 10/2008 | Jones | |
| 7,463,056 B1 | 12/2008 | Anderson et al. | |
| 7,478,189 B2 * | 1/2009 | Reed | 710/310 |
| 7,482,835 B1 | 1/2009 | Sun et al. | |
| 7,519,865 B1 | 4/2009 | Maly et al. | |
| 7,581,044 B1 * | 8/2009 | Davis | 710/52 |
| 7,616,508 B1 | 11/2009 | Landry et al. | |
| 7,675,929 B1 * | 3/2010 | Davis | 370/412 |
| 7,676,611 B2 | 3/2010 | Hui et al. | |
| 7,685,380 B1 | 3/2010 | Khu | |
| 7,747,809 B2 | 6/2010 | Hanscom | |
| 7,782,760 B2 | 8/2010 | Froroth et al. | |
| 7,836,352 B2 | 11/2010 | Sharma et al. | |
| 7,853,774 B1 | 12/2010 | Wentzlaff | |
| 7,882,296 B2 | 2/2011 | Reed | |
| 7,885,122 B2 | 2/2011 | Landry et al. | |
| 7,996,572 B2 * | 8/2011 | Blankenship et al. | 710/5 |
| 8,078,786 B2 * | 12/2011 | Hong et al. | 710/310 |
| 8,085,800 B2 * | 12/2011 | Naven et al. | 370/412 |
| 8,400,915 B1 * | 3/2013 | Brown et al. | 370/230 |
| 2004/0076116 A1 * | 4/2004 | Hefty et al. | 370/230 |
| 2005/0015520 A1 | 1/2005 | Berg et al. | |
| 2005/0091383 A1 | 4/2005 | Bender et al. | |
| 2005/0273400 A1 * | 12/2005 | Blankenship et al. | 705/28 |
| 2007/0233821 A1 | 10/2007 | Sullivan et al. | |
| 2008/0163005 A1 | 7/2008 | Sonksen et al. | |
| 2009/0292960 A1 | 11/2009 | Haraden et al. | |
| 2010/0083040 A1 | 4/2010 | Voigt et al. | |
| 2010/0251055 A1 | 9/2010 | Murakami et al. | |
| 2010/0318716 A1 * | 12/2010 | Nguyen | 710/314 |
| 2010/0325495 A1 | 12/2010 | Talla et al. | |
| 2011/0029706 A1 | 2/2011 | Bekooij et al. | |
| 2012/0011283 A1 * | 1/2012 | Freking et al. | 710/5 |

FOREIGN PATENT DOCUMENTS

| | | | |
|---|---|---|---|
| CN | 1768333 A | 5/2006 | |
| EP | 0947049 A1 | 10/1999 | |
| EP | 1892836 A1 | 2/2008 | |
| JP | 2002246538 A | 8/2002 | |
| JP | 2006178826 A | 7/2006 | |

OTHER PUBLICATIONS

Blank, Annika et al., "Advanced Power Virtualization on IBM System p5," IBM.com/redbooks, Oct. 2005, pp. 1-452.

Mitchell, Jim et al., "IBM Power5 Process-based Servers: A Highly Available Design for Business-Critical Applications," Oct. 2005, pp. 1-44.

Patel, Bindesh et al., "Transaction-based Debug of PCI Express Embedded SoC Platforms," CompactPCI and AdvancedTCA Systems, Dec. 2004, pp. 1-4.

Paz-Vincente, R. et al., "Time-Recovering PCI-AER Interface for Bio-Inspired Spiking Systems," Proceedings of the SPIE—The International Society for Optical Engineering, vol. 5839, No. 1, pp. 111-118, May 2005 (Abstract Only).

"z/Architecture—Principles of Operation," SA22-7932-08, Ninth Edition, Aug. 2010, pp. 1-1496.

Office Action for U.S. Appl. No. 13/151,079 dated Feb. 19, 2013.

"IEEE 100: The Authoritative Dictionary of IEEE Standards Terms," (IEEE Std 100-2000) Seventh Ed. IEEE: 2000.doi: 10.1009/IEEESTD.2000.322234 URL: http://ieeexplore.ieee.org/stamp/stamp.jsp?tp=&arnumber=4116792&isnumber=4116786) D section. pp. 266-348.

Pricer et al., "Computers, Software Engineering, and Digital Devices," Richard C. Dorf, Ed. CRC Press: 2005, Chapter 2: Memory Devices, pp. 1-31.

"Aspect" Collins English Dictionary. HarperCollins Publishers: 2000. Retrieved from http://www.credoreference.com/entry/hcengdict/aspect, p. 1.

Kai et al., "A Study of Lossless Reconfiguration on Packet Processing System," NTT Network Service Systems Laboratories, B-6-150, Sep. 2003, pp. 1-7, English Translation.

Griese et al., "A Reconfigurable Ethernet Switch for Self-Optimizing Communication Systems," 2006, in IFIP International Federation for Information Processing, vol. 216, Biologically Inspired Cooperative Computing, eds. Pan, Y, Rammig, E, Schmeck, H., Solar, M., (Boston, Springer), pp. 115-124.

International Search Report and Written Opinion for PCT/IB2012/052295 dated Sep. 13, 2012.

International Search Report and Written Opinion for PCT/IB2012/052299 dated Sep. 13, 2012.

Bender et al., U.S. Appl. No. 13/452,017, filed Apr. 20, 2012.

Bender et al., Office Action for U.S. Appl. No. 13/452,017, filed Apr. 20, 2012, dated Aug. 29, 2012.

Bender et al., U.S. Appl. No. 13/151,079, filed Jun. 1, 2012.

Bender et al., U.S. Appl. No. 13/459,135, filed Apr. 28, 2012.

* cited by examiner

AVOIDING NON-POSTED REQUEST DEADLOCKS IN DEVICES BY HOLDING THE SENDING OF REQUESTS

BACKGROUND

One or more aspects of the invention relate, in general, to devices within a communications environment, and in particular, to avoiding deadlocks within the devices.

Devices are used within a communications environment, such as a computing environment, to facilitate communications between various components of the environment. For instance, a device may be coupled to an external device at one end and a system bus at the other, and the device receives requests from the external device and forwards them to a system component via the system bus.

Many types of devices may be used for communication, including PCIe (Peripheral Component Interconnect Express) devices. PCIe devices are based on PCIe technology, which is a point-to-point technology. PCIe devices communicate via a logical connection called an interconnect or link. A link is a point-to-point communication channel between two PCIe ports, allowing both to send/receive ordinary PCI-requests (configuration read/write, I/O read/write, memory read/write) and interrupts.

PCIe has associated therewith a specification that provides particular rules to be followed for communications using PCIe devices. This specification is developed and maintained by the PCI-SIG (PCI Special Interest Group). One such rule is an ordering rule that dictates the order in which requests, including transactions, are to be processed.

BRIEF SUMMARY

The shortcomings of the prior art are overcome and advantages are provided through the provision of a device that includes a port to receive requests and a request engine coupled to the port, the request engine configured to perform a method. The method includes, for instance, determining whether the port is able to make forward progress on inbound requests; responsive to determining forward progress is blocked on the port, holding sending a request to the port; and responsive to determining the port is making forward progress, sending the request to the port.

Methods and computer program products relating to one or more aspects of the present invention are also described and claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided to control processing within a device, in order to, for instance, avoid a deadlock situation. A local request engine of the device determines prior to making a request whether the port of the device that is to service the request is making forward progress in processing other requests. If forward progress is being made, then the request is forwarded to the port. Otherwise, the request is held. This avoids a deadlock situation and allows the device to remain operative even in partial recovery situations.

In one specific example, the device is a PCIe device and the deadlock that is avoided is a non-posted request deadlock. A non-posted request can deadlock, in one example, due to PCIe ordering rules, when a shared system resource or device port is in recovery. For instance, if an outbound port of the device is not processing posted requests and only a certain number of posted writes can be pending at one time, then additional posted writes accumulate at the port. Since the ordering rules specify no request can pass a posted write, a non-posted request that is received cannot be processed and may cause a deadlock. Thus, in accordance with an aspect of the present invention, prior to making the request, the requester determines if forward progress is being made on processing the posted requests. If so, the request is sent; otherwise, sending of the request is delayed.

As described above, in one embodiment, requests can be posted or non-posted requests. Further, requests can be completion requests. Posted requests are requests that do not expect to receive a completion, and completions are not required for posted requests. Examples of posted requests include memory writes and messages. Posted requests are contrasted to non-posted requests in which completion is required. Examples of non-posted requests are memory reads, memory read lock, I/O reads, I/O writes, configuration reads and configuration writes. Completions are requests which complete earlier issued requests. Completions include data completions and non-data completions.

Figure 1:
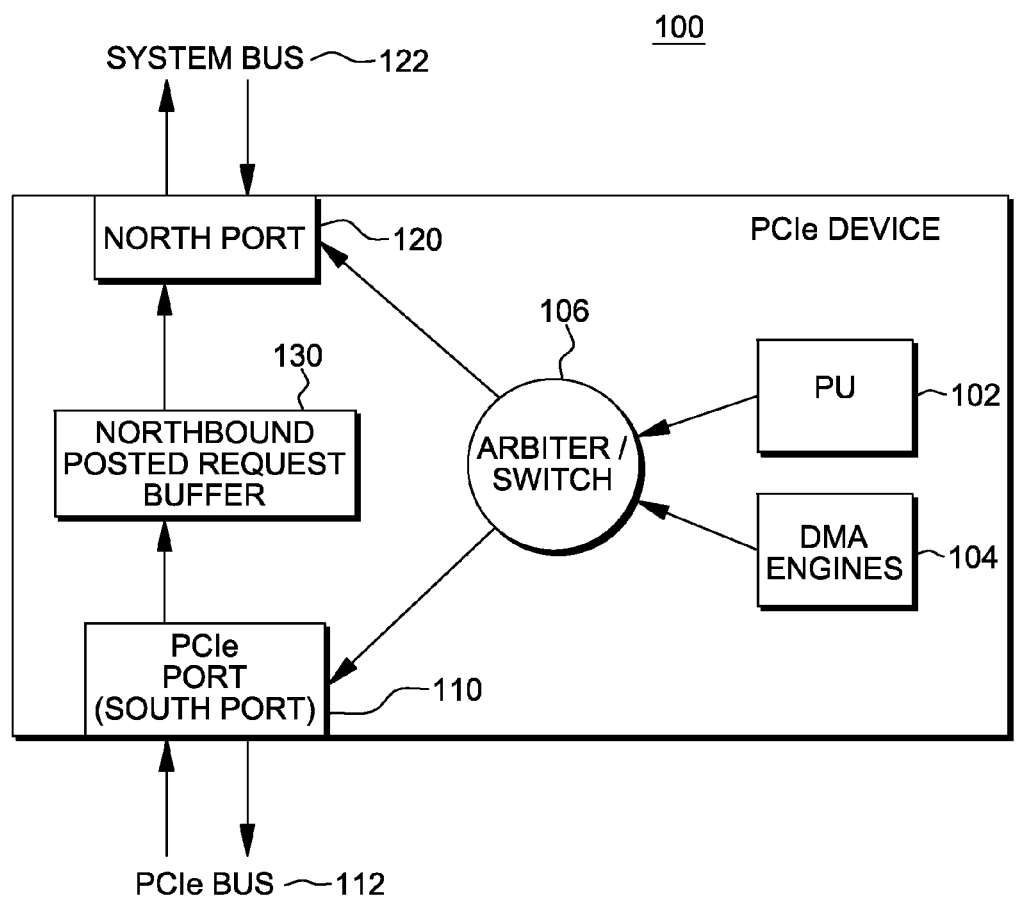
FIG. 1 depicts one example of a device used in accordance with an aspect of the present invention.

One example of a device used in accordance with an aspect of the present invention is described with reference to FIG. 1. In this example, the device is a PCIe device; however, one or more aspects of the present invention can be used with other types of devices. Referring to FIG. 1, a PCIe device 100 includes, for instance, a plurality of local request engines including one or more local processors (PUs) 102 and one or more direct memory access (DMA) engines 104, as examples. The local request engines are coupled to at least one arbiter/switch 106 used to control which port of the device is to receive a particular request from the processors or DMA engines.

Switch 106 directs requests from the request engines to a south port 110, which is coupled to a PCIe bus 112, when the requests are for an external PCI device; and to a north port 120, which is coupled to a system bus 122, when the requests are system requests.

Requests that are inbound to the device from an external device are received at south port 110 and transmitted to north port 120. Requests that are posted requests are transmitted via a buffer 130.

In PCI and other technologies, requests are to be processed in a particular order based on a set of ordering rules. These rules are provided to prevent deadlock situations; however, in certain scenarios, deadlocks can still occur, as described herein, and thus, are addressed by one or more aspects of the present invention. One example of ordering rules for PCI is shown in the below table.

| Row Pass Column? (Y, N, Y/N) | Posted Memory Write Memory Request | Non-Posted Memory Read I/O Read/Write Configuration Read/Write | Completion Completion w/out Data Completion with Data |
|---|---|---|---|
| Posted Memory Write Message Request | N | Y | Y |
| Non-Posted Memory Read IO Read/Write Configuration Read/Write | N | Y/N | Y/N |
| Completion Completion w/out Data Completion w/ Data | N | Y | Y/N |

Y—means the command must be allowed to pass to avoid deadlock. The command cannot be blocked indefinitely and cannot be blocked by the command in the specified column.
N—means the command cannot pass the command in the specified column, else data integrity may be compromised.
Y/N—means the command is allowed to pass, but is not required to pass the command in the specified column. It has no strict ordering requirement.

The PCI ordering rules require that posted requests be able to pass non-posted requests and completions. Further, one overriding ordering rule is that no requests can pass a posted write request.

To manage processing of the different types of requests and to control access to the resources processing the requests, credits are maintained for each available resource for handling a given request type. A credit is consumed when a request of that type is transmitted by a transmitter (e.g., a south port) to a receiver (e.g., north port), and the request consumes the resource in the receiver. The credit is returned to the transmitter when the request completes or otherwise frees the resource. For instance, there may be x credits assigned to posted write requests. If the number of credits runs out, then requests will queue at the transmitter. If no credit is available for a given request type, requests of that type are blocked until the credit becomes available.

In one implementation, there are different types of credits, including posted credits, non-posted credits and completion credits that correspond to posted requests, non-posted requests and completion requests, respectively. Further, each type of credit may have header and data credits. For instance, posted credits may include posted header credits for headers, and posted data credits for the data. The same is true for non-posted requests and completion requests.

Figure 2:
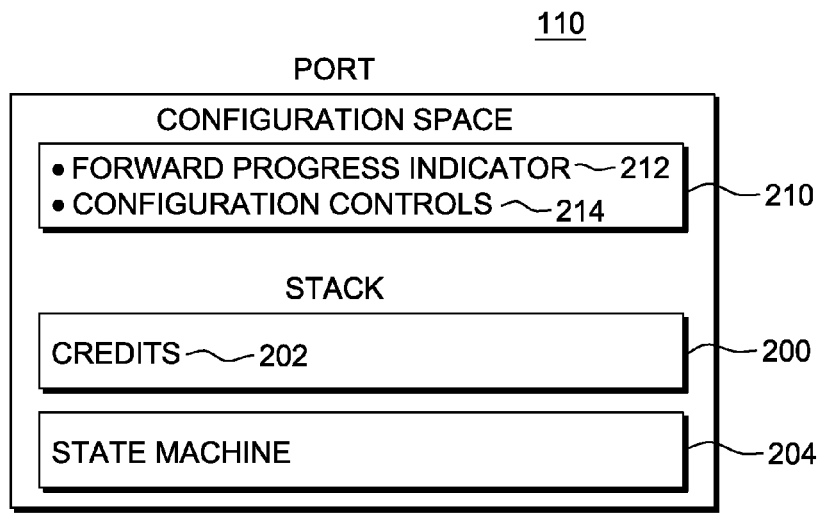
FIG. 2 depicts further details of a port of the device of FIG. 1, in accordance with an aspect of the present invention.

In one example, the credits are maintained at a port of the device, as shown in FIG. 2. Referring to FIG. 2, a port, such as south port 110, includes a stack 200 in which credits 202 are maintained, and a state machine 204 that implements various logic of the device. Credits 202 include the various type of credits, including, but not limited to, the posted credits, the non-posted credits and/or the completion credits.

Additionally, port 110 also includes a configuration space 210. Configuration space 210 includes a number of controls, including, for instance, a forward progress indicator 212, which is stored in a device status register of the configuration space, and used to determine if the port is making forward progress on requests; and one or more configuration controls 214 used to control the forward progress indicator. The port may also include other spaces, other controls and/or other information. Additional information regarding the configuration controls is provided below.

In one embodiment, configuration controls 214 include the following controls:

1. Header Credit Threshold: This threshold value defines the point at which the available posted header credits in a device are considered LOW. When there are fewer credits advertised to the external PCIe device than the value programmed here, the forward progress indicator begins looking for credit updates within the programmed Forward Progress Time Window, which is described below.
2. Data Credit Threshold: This threshold value defines the point at which the available posted data credits in the device are considered LOW. When there are fewer credits advertised to the external PCIe device than the value programmed here, the forward progress indicator begins looking for credit updates within the programmed Forward Progress Time Window.
3. Window Timer: This timer value defines the Forward Progress Time Window, which is the length of time hardware (e.g., the state machine) will wait for any forward progress to be made on credit returns to the external PCIe device for the inbound posted credits before de-asserting the forward progress indicator in the device status register.

If no posted header or data credits are returned within this time window and the posted header or posted data credits available value is less than the programmed forward progress thresholds, the forward progress indicator will go to, for instance, '0' indicating the device is not currently making forward progress and there is a potential for deadlocking outbound non-posted requests.

In one particular example described herein, non-posted requests can deadlock on a functional PCIe port (e.g., the south port) when a shared system resource or port (e.g., the north port) is in recovery due to the ordering rules. If the posted credits run out on a PCI link and other posted requests are queued at the transmitter end of the link, no requests will progress in the direction of the posted writes which are stalled.

Thus, in accordance with an aspect of the present invention, a capability is provided to detect when the device is running out of posted credits due to a prolonged traffic backup. In one example, this capability uses the forward progress indicator, described above, to identify whether a given port is able to make forward progress on inbound posted write requests. If the port is able to continue making forward progress on inbound posted write requests, then an outbound non-posted request will not be deadlocked due to a lack of inbound posted credits backing up inbound completion payloads from the responding PCIe device. Reading the forward progress indicator allows the request engine to make a decision as what to do next.

The forward progress indicator is checked and updated relatively continually using the hardware within the port (e.g., state machine 204). The hardware is not to indicate that the port is making forward progress when it is not, and at the same time, the hardware is not to be overly pessimistic and indicate the port is not making forward progress during high throughput durations. There are multiple system factors that can affect how the port determines if it is making forward progress. These factors are to be considered and the system is to allow for adjustments. Thus, in one embodiment, the configuration controls are used to adjust the function of the forward progress indicator, as indicated below.

Figure 3:
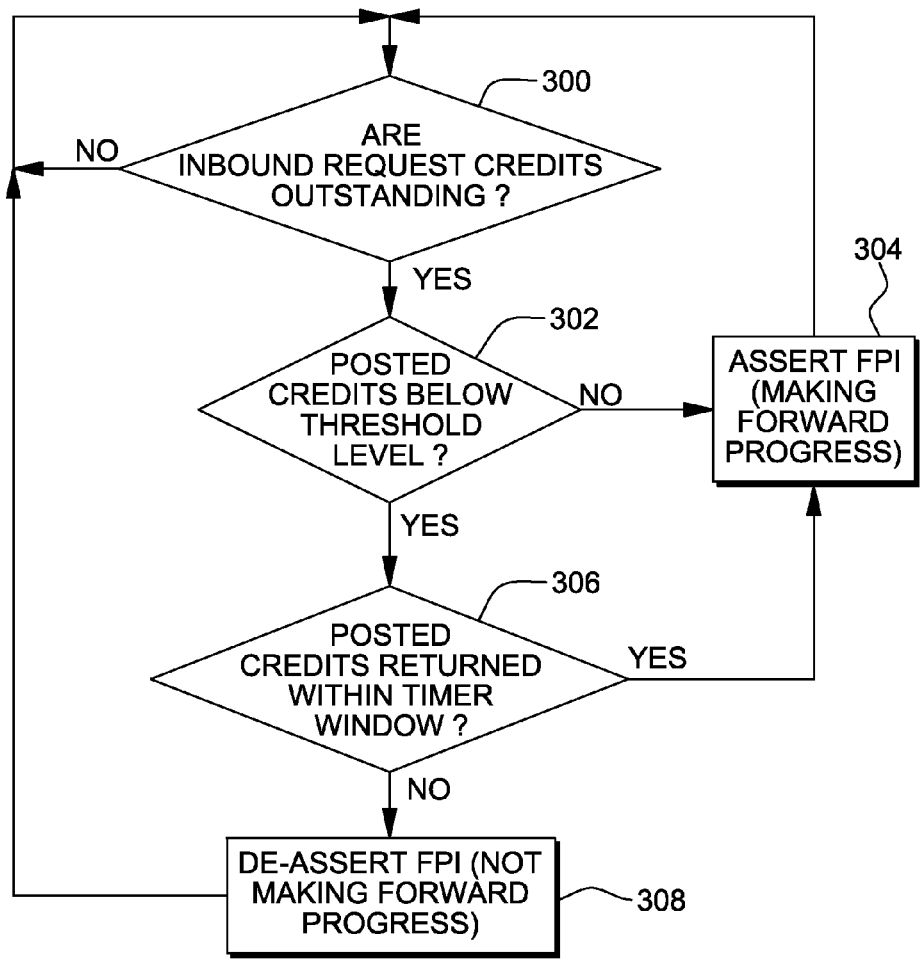
FIG. 3 depicts one embodiment of the logic to set/reset a forward progress indicator used in accordance with an aspect of the present invention.

Use of the configuration controls is described with reference to FIG. 3. Initially, in one example, a determination is made as to whether there are inbound posted request credits (a.k.a., posted credits) outstanding, STEP 300. For instance, are there both posted header credits and posted data credits. If there are inbound posted request credits outstanding, then a further determination is made as to whether posted credits for the port are below the threshold level, INQUIRY 302. If both the header and data credits are not below the threshold level, then the indicator indicates that forward progress is being made (e.g., the forward progress indicator is set to 1), STEP 304. However, if the posted credits (e.g., posted header credits and/or posted data credits) are below the threshold, then yet another determination is made as to whether one or more posted credits have been returned within the window timer, INQUIRY 306. If both posted header and data credits are returned within the window timer, then again forward progress is being made, STEP 304. Processing then returns to INQUIRY 300, since this logic is repeated at defined time intervals.

Returning to INQUIRY 306, if either or both of the posted header and data credits are not returned within the window timer, then the indicator is set to indicate that forward progress is not being made (e.g., the forward progress indicator is set to 0), STEP 308. Processing then continues with STEP 300.

In one embodiment, the configuration controls are configurable via processor code (e.g., firmware within the local processor—As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.) For example, the processor code can set or adjust the thresholds automatically based on learned knowledge of the device, etc. For instance, logic within a root complex of the device or coupled thereto performs a bus walk to learn the configuration of the device, such as the PCIe link width; a maximum program link Transaction Layer Packet (TLP) size; and/or initial credit counts (based on internal buffer size). Then, the processor code (e.g., of PU 102) can set/change the values of the configuration controls based on this information.

Further, for the window, the value is provided in status maintained in configuration space of the port that allows the port to see how long it has been since the last credit update, while checking the FPI indicator. This information can then be used to adjust the window. As an example, a port may have 8 posted header credits, 512 posted data credits (8 kB of buffer space, 16 B per credit) and is an x8 PCIe Gen 1 link with max TLP size of 4 kB. With this configuration, it would take about 2 microseconds to transmit a single 4 kB TLP. Thus, in one example, the FPI header credit threshold is set to 2, the FPI data credit threshold to 256 (4 kB) and the FPI window timer is set to 4 microseconds. As system parameters adjust, adjustments are made to the FPI configuration settings to account for the changed parameters. For example, if the link width dropped to x4 in the same system, the time required to transmit a max sized TLP would double to 4 microseconds. Therefore, in one embodiment, the FPI window timer is updated to be 8 microseconds in order to account for the TLP transmission latency.

Figure 4:
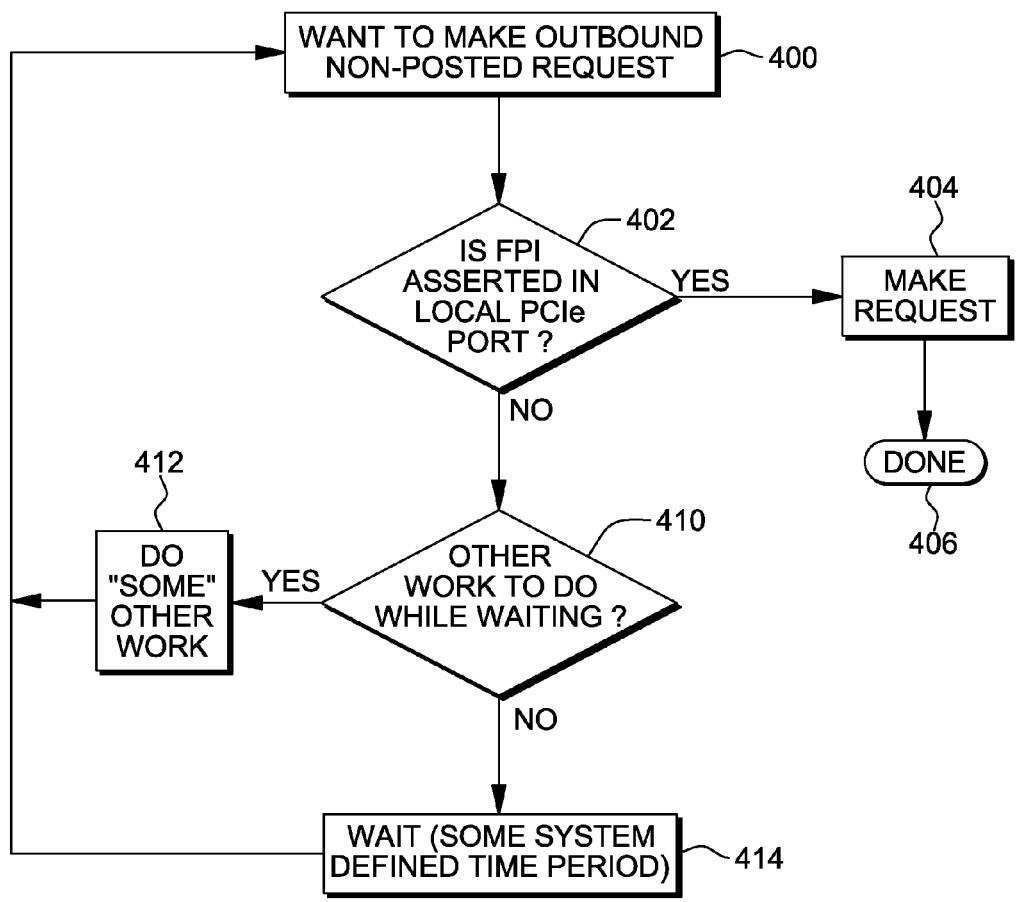
FIG. 4 depicts one embodiment of the logic to determine if a request is to be sent to a port of the device, in accordance with an aspect of the present invention.

As described above, the forward progress indicator is used by a requester to determine if it should make a non-posted request. One embodiment of the logic associated with making this determination is described with reference to FIG. 4.

Initially, a requester would like to make an outbound non-posted request, STEP 400. Thus, a determination is made as to whether the forward progress indicator is asserted in the local port (e.g., south port), INQUIRY 402. If the forward progress indicator indicates forward progress is being made, then the request is made, STEP 404, and processing is complete, STEP 406.

Returning to INQUIRY 402, if the forward progress indicator indicates that progress is not being made (referred to herein as blocked), then the request is not sent, and in one embodiment, a check is made as to whether the requester has other work to perform, INQUIRY 410. If there is other work to be performed, then the requester performs other work, STEP 412, and processing continues with STEP 400. Otherwise, the requester waits a predefined amount of time, STEP 414, and then will make the determination again. Processing continues with STEP 400.

Described in detail above is a capability to avoid a non-posted request deadlock situation and to allow the device to remain operative even in a partial recovery situation. This is accomplished by, for instance, providing a single status bit in the device's port configuration space which can be read by a local request engine, such as a local processor, prior to the engine making any non-posted request to an external device attached to the associated PCI port. The status bit, which is referred to as the forward progress indicator, identifies when the given port is able to make forward progress on inbound posted write requests, therefore indicating if there is a potential for non-posted request deadlock. The device's local request engine can use this information to avoid non-posted request deadlock situations.

Since there are many factors involved in determining if the port is actually making forward progress, configuration controls for the status indicator are provided allowing tuning of the forward progress indicator depending on system configuration and data flow.

In some devices, particularly in high RAS (Recoverability, Availability, Serviceability) devices, it is not desirable for a recovery action on a single port or resource to cause a complete recovery of the device. It may be possible to recover the offending port or resource and allow the rest of the device to remain active and fully functional. In such devices, avoiding the non-posted request deadlock can facilitate this type of recovery.

As described above, completion packets for non-posted requests can deadlock in high RAS PCIe devices where the PCIe port uses multiple shared resources for inbound requests and completions; the shared resources can be recovered separately from the PCIe port; and there are multiple individual and separately controlled requesters for the PCIe port. The potential deadlock is due to a combination of the following, as examples: partial PCIe device recovery blocks destination point for inbound posted writes, and the PCIe port is still active in accepting inbound requests/completions; the PCIe posted write flow control credits are exhausted; the PCIe ordering rules in which nothing can bypass a queue's posted write requests, e.g., if the device is out of posted write requests and has queued posted writes, no non-posted completions will complete due to the ordering rules; and/or internal device requester makes a non-posted request to the PCIe port, since it is not in the recovery domain.

In a particular example, a non-posted deadlock can occur if a recovery scenario occurs on the north port, which is a shared resource, and the write data from the south port backs up in the posted write buffer targeting the north port. When the buffer fills up do to extended recovery times of the north port, the south port will run out of PCI posted credits, which in turn stalls all inbound traffic from the device attached to the south port due to PCIe ordering rules. The local processor may want to read a memory location in the PCIe device attached to the south port at any time. If it happens to attempt this non-posted read request after the inbound write buffer has run out of PCIe credits, the read request will receive a completion timeout in the local device because the endpoint PCIe device will not be allowed to return the completion data due to PCIe ordering rules. This timeout, in conjunction with the north port recovery, may cause a severe error which requires the entire system to be reset. This is avoided in accordance with one or ore aspects of the present invention.

In accordance with an aspect of the present invention, a forward progress indicator indicates when a PCIe port is making progress in processing inbound posted write requests. If the device is making forward progress, the non-posted request completions can be returned. The indicator is readable in the device's status register. Any device requester which cannot tolerate response timeouts can check the status before issuing the request. The forward progress indicator is tunable by configurable parameters, such as the posted header credit threshold; the posted data credit threshold; and the timer window.

Advantageously, by using the forward progress indicator, the PCIe device can support partial recovery while maintaining an active PCIe port. Request engines can check the status indicator before making non-posted requests to avoid the completion timeout. The forward progress indicator provides real-time determination of progress being made.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
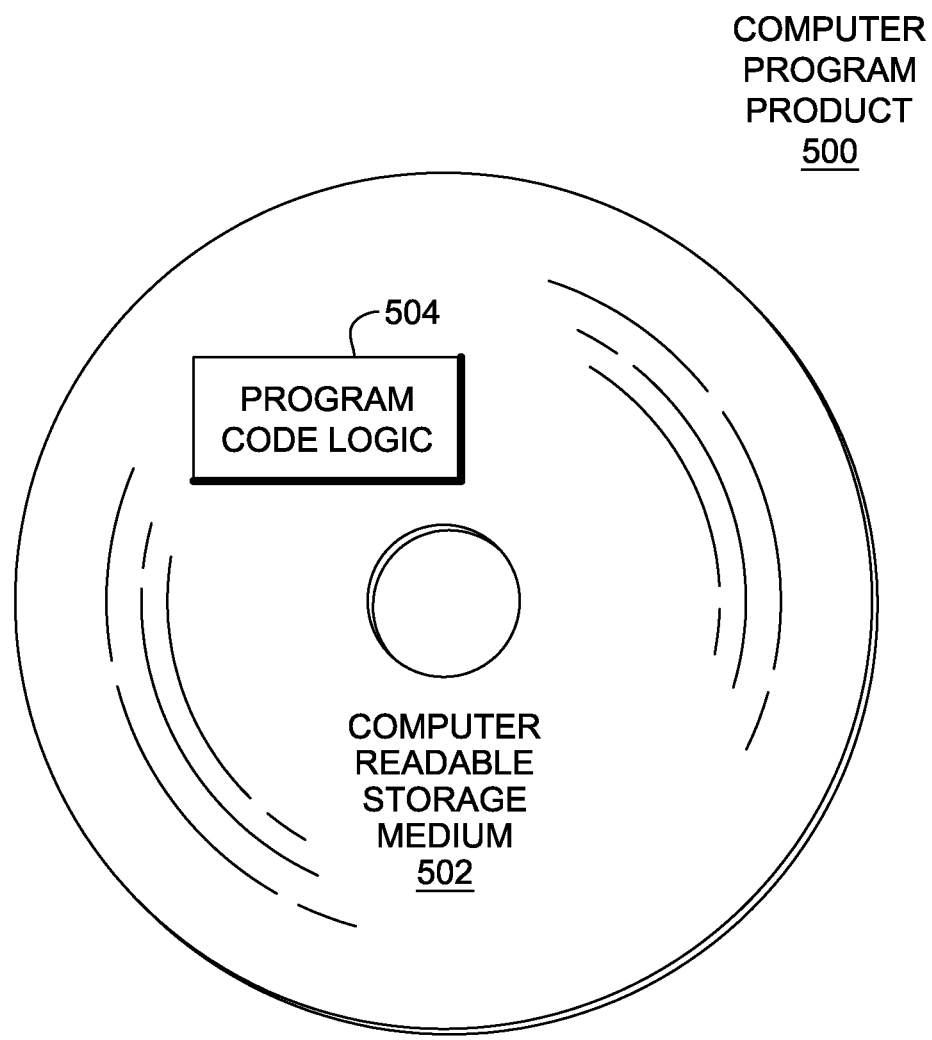
FIG. 5 depicts one embodiment of a computer program product incorporating one or more aspects of the present invention.

Referring now to FIG. 5, in one example, a computer program product 500 includes, for instance, one or more non-transitory computer readable storage media 502 to store computer readable program code means or logic 504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, other types of devices may incorporate and/or use one or more aspects of the present invention. Further, other types of configuration controls may be used, as well as well as other types of credits. Yet further, other rules may be used to determine when to assert/deassert the forward progress indicator. Many other variations are also possible.

Various types of computing environments can benefit from one or more aspects of the present invention. For instance, a computing environment that includes at least one processor coupled to memory and I/O devices or interfaces via one or more system buses may include one or more of these devices and/or one or more aspects of the present invention. Further, particular systems that may include one or more of these devices and/or one or more aspects of the present invention includes System z® or zEnterprise 196 (z196) offered by International Business Machines Corporation. Moreover, in other embodiments other hardware may be used, or software. Many variations are possible.

As a further example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A device comprising:
    a port to receive requests; and
    a request engine coupled to the port, the request engine configured to perform a method, the method comprising:
        determining whether the port is able to make forward progress on inbound requests;
        based on determining forward progress is blocked on the port, holding sending a request to the port; and
        based on determining the port is making forward progress, sending the request to the port.

2. The device of claim 1, wherein the determining comprises checking a forward progress indicator stored within the port to determine if the port is making forward progress.

3. The device of claim 1, wherein the port is a south port of the device, and the request engine is one of a local processor of the device or a direct memory access engine of the device.

4. The device of claim 1, wherein based on determining forward progress is blocked, the request engine performing other work.

5. The device of claim 2, wherein the port includes hardware, the hardware configured to set the forward progress indicator to indicate whether forward progress is being made.

6. The device of claim 5, wherein to set the forward progress indicator, the hardware is configured to:
    compare a number of posted credits for the port with a threshold level; and
    set the forward progress indicator to indicate forward progress, based on the comparing indicating the number of posted credits is at a defined level with respect to the threshold level.

7. The device of claim 5, wherein to set the forward progress indicator, the hardware is configured to:
    determine whether at least one posted credit is outstanding for the port;
    based on determining at least one posted credit is outstanding, perform one or more checks of the at least one posted credit; and
    set the forward progress indicator to indicate blocked, based on the performing indicating an insufficient number of posted credits.

8. The device of claim 6, wherein the hardware is further configured to set the forwarded progress indicator to indicate blocked, based on the comparing indicating the number of posted credits is not at the defined level with respect to the threshold level.

9. The device of claim 7, wherein to perform the checks, the hardware is further configured to:
    determine whether a number of the posted credits is below a threshold level; and
    based on the number of the posted credits being below the threshold level, determine whether one or more posted credits were returned within a timer window, wherein the forward progress indicator is set to blocked, based on the number of posted credits being below the threshold level and one or more posted credits not being returned within the timer window.

10. The device of claim 9, further comprising a processor to set or adjust at least one of the threshold level and the timer window.

11. A computer program product for controlling processing within a device of a communications environment, the computer program product comprising:
    a computer readable storage medium readable by a processing circuit and storing instructions for execution by the processing circuit for performing a method comprising:
        determining by a requester of the device whether a port of the device is able to make forward progress on inbound requests;
        based on determining forward progress is blocked on the port, holding sending a request to the port; and
        based on determining the port is making forward progress, sending the request to the port.

12. The computer program product of claim 11, wherein the determining comprises checking a forward progress indicator stored within the port to determine if the port is making forward progress.

13. The computer program product of claim 12, wherein the method further comprises setting the forward progress indicator to indicate whether forward progress is being made, the setting comprising,
    determining whether at least one posted credit is outstanding;
    based on determining at least one posted credit is outstanding, performing one or more checks of the at least one posted credit; and
    setting the forward progress indicator to indicate blocked, based on the performing indicating an insufficient number of posted credits.

14. A device comprising:
    a port to receive requests, the port including a forward progress indicator and configured to set the forward progress indicator, wherein to set the forward progress indicator, the port is configured to:
        compare a number of posted credits for the port with a threshold level; and
        set the forward progress indicator to indicate forward progress, based on the comparing indicating the number of posted credits is at a defined level with respect to the threshold level; and
    a request engine coupled to the port, the request engine configured to perform a method, the method comprising:
        determining, using the forward progress indicator whether the port is able to make forward progress on inbound requests;
        based on determining forward progress is blocked on the port, holding sending a request to the port; and
        based on determining the port is making forward progress, sending the request to the port.

* * * * *